US007009966B2

(12) United States Patent
Borchering

(10) Patent No.: US 7,009,966 B2
(45) Date of Patent: Mar. 7, 2006

(54) METHOD AND APPARATUS FOR A DATA FIRST OPTICAL NETWORK

(75) Inventor: James W. Borchering, West Chicago, IL (US)

(73) Assignee: Tellabs Operations, Inc., Naperville, IL (US)

( * ) Notice: Subject to any disclaimer, the term of this patent is extended or adjusted under 35 U.S.C. 154(b) by 846 days.

(21) Appl. No.: 09/785,370

(22) Filed: Feb. 16, 2001

(65) Prior Publication Data

US 2001/0036191 A1   Nov. 1, 2001

Related U.S. Application Data

(60) Provisional application No. 60/183,486, filed on Feb. 18, 2000.

(51) Int. Cl.
    *H04Q 11/00*    (2006.01)

(52) U.S. Cl. .................. 370/386; 370/430; 398/48
(58) Field of Classification Search ............. 398/101, 398/79, 45, 47, 48, 50; 370/401, 400, 352–356, 370/397, 254, 237, 386, 354, 369, 422, 430; 709/249
    See application file for complete search history.

(56) References Cited

U.S. PATENT DOCUMENTS 6,233,074 B1 * 5/2001 Lahat et al. ................. 398/79
6,388,782 B1 * 5/2002 Stephens et al. ............. 398/79
6,535,313 B1 * 3/2003 Fatehi et al. ................ 398/101

* cited by examiner

*Primary Examiner*—John Pezzlo

(57) ABSTRACT

A gateway exchange node according to a first embodiment of the present invention is disclosed. The gateway exchange node includes an exchange area network (XAN) xswitch. The gateway exchange node includes a wide area network (WAN) wavelength switch coupled to the XAN xswitch.

22 Claims, 2 Drawing Sheets

METHOD AND APPARATUS FOR A DATA FIRST OPTICAL NETWORK

This patent application claims the priority date of the U.S. provisional patent application having the assigned Ser. No. 60/183,486 filed on Feb. 18, 2000.

FIELD OF THE INVENTION

The present invention relates to communication systems. More specifically the present invention relates to a communication system implementing an architecture that operates with multiple switching domains.

BACKGROUND

The new converged public network will differ from today's public network due to data demands and the economics of optical transmission. An important consideration for this new converged public network is the choice of switching technology. This choice is influenced by the increasing amount of data traffic relative to voice traffic. Data traffic will be 50 times that of voice traffic by 2003 according to one industry forecast. This will require that the architecture be optimized first for data traffic with voice being an application carried by the data network. In addition the economics of optical transmission are dictating the tradeoffs between switching, transmission and labor. According to one vendor the price/performance of optical transmission is doubling every 12 months. Distance and incremental bandwidth are becoming significantly less important in determining total life cycle cost while labor cost is increasing its impact.

SUMMARY OF THE INVENTION

A gateway exchange node according to a first embodiment of the present invention is disclosed. The gateway exchange node includes an exchange area network (XAN) xswitch. The gateway exchange node includes a wide area network (WAN) wavelength switch coupled to the XAN xswitch. According to a first implementation of the first embodiment of the gateway exchange node, the XAN xswitch supports Ethernet and SONET switching. According to a second implementation of the first embodiment of the gateway exchange node, the WAN wavelength switch supports wavelength switching.

A gateway exchange node according to a second embodiment of the present invention is disclosed. The gateway exchange node includes an exchange area network (XAN) xswitch. The gateway exchange node includes a wide area network (WAN) wavelength switch. The gateway exchange node includes a digital crossconnect system (DCS). The gateway exchange node includes a data switch. The gateway exchange node includes a voice switch. The gateway exchange node includes an internet protocol (IP) switch router. According to a first implementation of the second embodiment of the gateway exchange switch, the XAN xswitch, WAN wavelength switch, DCS, data switch, voice switch, and IP switch router all include an operating system for networking. According to a second implementation of the second embodiment of the gateway exchange switch, the WAN wavelength switch, DCS, data switch, voice switch, and IP switch router all include a service delivery point.

A network according to an embodiment of the present invention is disclosed. The network includes a first gateway exchange node having an exchange area network (XAN) xswitch and a wide area network (WAN) wavelength switch. The network includes a network operations center (NOC) coupled to the gateway exchange node.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Switching considerations for a data first, optical public network are disclosed. The current public network architecture is based on circuit switching optimized for voice traffic and expensive transmission relative to labor costs. The technology for the physical transport layer is SONET/SDH. This physical layer, layer 1, is the convergence layer for the current public network. Both voice and data network elements connect to a common SONET/SDH infrastructure. Above layer 1, voice and data use different switching elements and technology. SONET/SDH is the choice for both long haul and local physical layer switching and transmission.

The new converged public network may reduce the number of element distinct layers from the current 4 (physical media ADMs, SONET/SDH crossconnects, ATM, IP) to two element distinct layers (IP and Optical). This may raise the convergence layer to IP. This is referred to as Packet over Wave (PoW). Switching creates a dynamic transport network that will meet the need for recovery, traffic management and rapid provisioning of customer service. The choices for switching technology are SONET/SDH, ATM, MPLS, Ethernet and IP. Each of these choices has advantages and disadvantages in long haul and local applications.

An architecture for the new converged public network should be optimized for data and provide support for both packet switched services as well as accommodating traditional circuit based services and legacy network elements, and can favor trading low cost optical bandwidth for labor. Protocol complexity thus can be reduced due to an impact on labor costs. This architecture rationale is based at least in part on the growing dominance of data transport and the economics of fiber optic transmission.

Carrier Exchange Architecture (CXA)

Figure 1:
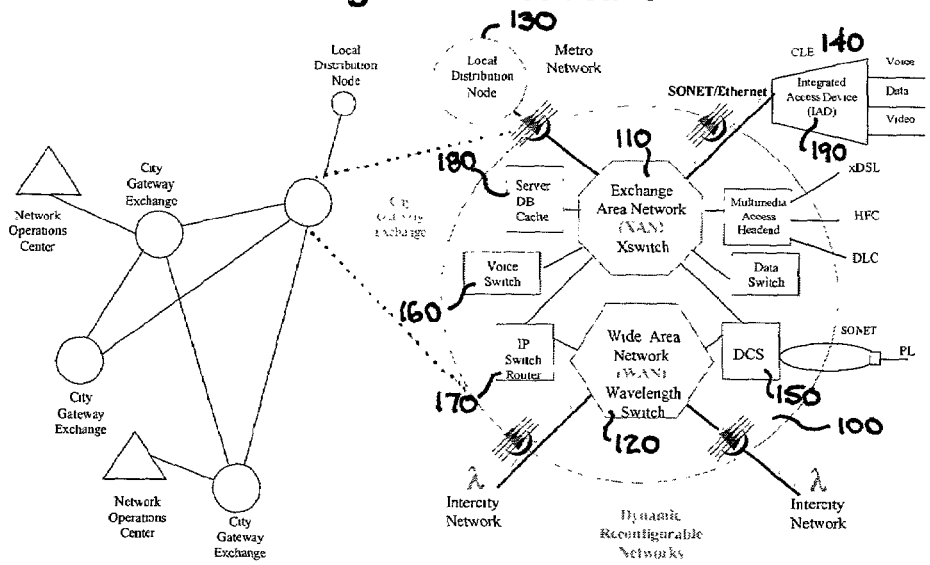
FIG. 1 illustrates a gateway exchange node implementing the carrier exchange architecture according to an embodiment of the present invention.

FIG. 1 illustrates a gateway exchange node 100 implementing the Carrier Exchange Architecture (CXA) according to an embodiment of the present invention. The gateway exchange node 100 implementing CXA may include an Exchange Area Network Xswitch 110 and a Wide Area Network (WAN) Wavelength Switch 120. According to an embodiment of the gateway exchange node 100 implementing CXA, the WAN Wavelength Switch 120 may be implemented using a TITAN 6700 optical networking gear, available from Tellabs of Lisle, Ill. The XAN Xswitch 110 may be implemented using a switched gigabit Ethernet hub which is preferably based upon and derived from the TITAN 6500 system, the TITAN 6500 system also available from Tellabs of Lisle, Ill.

The CXA described herein leverages existing technology, gigabit Ethernet and switched hubs. The CXA is associated with transport and can be described in part as an evolution of today's circuit based transport to a packet based architecture. The CXA is independent of IP services strategy. The CXA is data aware rather than a data beneficiary. Systems that have an Ethernet interface can be made compatible with the Xswitch. ANS and MAS can also be included. The CXA provides for the continuation of SONET and the DCS. More traditional DSCs can be integrated using gigabit Ethernet ports and network management. The CXA specifies the relationship between the Xswitch and the OXC, or optical switch. The CXA to a certain extent involves an application of certain Ethernet and premise data networking principles to the carrier market. Gigabit Ethernet has the potential for becoming a disruptive technology in the carrier market. The two dominate data networking protocols, IP and Ethernet, have marched through the territories of ATM, FDDI, Token Ring, X.25, IPX/SPX and many lesser protocols laying them to waste. SONET/SDH may well be a survivor but only time will tell.

The premise ATM market has nearly disappeared due to the presence of low cost switched 10/100/1000 mbit switched Ethernet hubs. The original ATM assumptions no longer seem to be true; hardware limited to layer 2 switching and fixed length cell, adequacy of OC3 and OC12 speeds and the necessity of the 48 byte cell size compromise for voice data integration (B-ISDN). Ethernet is frame based and avoids the SAR and ASIC limitations of ATM.

Converged Public Network

New public network architectures may be based on the ever growing dominance of data traffic and the economics of optical transmission. Data traffic is growing much faster than voice and in many networks has already surpassed voice. Given the extreme dependency of many public network service providers on the disproportionately large voice revenues, a new architecture optimized for data traffic must be quickly adopted. The architecture as well needs to accommodate the vast infrastructure that exists today. Finally this architecture must be based on the economies of scale and declining role of distance resulting from advances in optical networking. Data, optics and legacy systems have guided the definition for the architecture for the new "Converged Public Network". According to an embodiment of the gateway exchange node 100, the new Converged Public Network may be included in the local distribution node 130 or in the CLE 140 shown in FIG. 1.

An embodiment is described herein for this new converged public network. This embodiment encompasses four related architectures as follows:

1. Carrier eXchange Architecture (CXA)—This architecture describes how to build the converged public network consisting of exchange areas with their Central Office nodes and the intercity fiber routes connecting the exchange areas.

2. Voice over the Converged Public Network (VOCPN)—This architecture describes how existing and new voice services are provided over the new converged public network.

3. Business Access sub-Architecture (BAA)—How businesses connect to the network.

4. Residential Access sub-Architecture (RAA)—How residences connect to the network for personal or business needs.

Today voice, data and video converge on a common transport infrastructure managed by the SONET Digital Crossconnect System (DCS) and are transported by single wavelength optical terminals. According to an embodiment of the gateway exchange node 100, the DCS 150 may be coupled to the XAN Xswitch 110 and the WAN Wavelength Switch 120 shown in FIG. 1. Critical is an understanding of the requirements for these converged networks not only in the technology for transporting the voice, data and video traffic, but also the systems and processes used by carriers to operate the network, provide services to end users and support business processes. These systems and processes will also be requirements for the new Converged Public Network as well as a requirement to work with the embedded base of transport systems.

The architecture for today's public network was created when voice was the dominate traffic type and bandwidth and switching costs were high relative to labor and other costs associated with service delivery. Voice service information flows have a unique set of requirements that along with the available technologies of a few years ago lead to circuit based architectures optimized for voice band transmission rates. Early data networks carried minimal amounts of data and were designed to use voice band rates or in some cases subrates. As data volumes increased and evolved from character dominated to file dominated information flows, carrying data on networks designed for voice became less efficient. Technology and its economics as postulated by "Moore's Law" was also changing many of the assumptions behind the existing voice rate, circuit oriented network architecture. For the public networks the Internet model is also having a dramatic impact in that the communication paradigm. The 80/20 rule for local versus wide area traffic flows is reversing from 80% local to 80% wide area. This is triggering dramatic increases in data traffic on Wide Area Networks (WAN).

An analogy to Moore's law for optics is even greater in its impact. Optical technology is doubling price/performance every year. The old methods, which traded labor for investment in transmission and switching, are no longer valid. Optimizing for minimum route miles and maximum fill may no longer be the right choice. Trading bandwidth and simplicity for labor seems to be the strategy of many new carriers.

Reduced labor and capital costs will also be realized through network element consolidation. Fewer network elements will result in lower operations cost.

The time is rapidly approaching when network architectures will need to be created for data as the first and foremost application on the network. Solutions to effectively carry voice on this data first network are now being developed. The SALIX® 7000 series switching systems offered by Tellabs of Lisle, Ill. (formerly the Tellabs' AN2100 Gateway Exchange™ system and the SALIX® ETX5000 system offered by Salix of Gaithersburg, Md., which is now a Tellabs-owned company) are examples of products to effect this transformation of the network while preserving the embedded base. The embedded base in this case is the large number of circuit based class 5 offices such as the Lucent 5ESS and Nortel DMS. The new Converged Public Network data first Carrier Exchange Architecture preferably employs data protocols, packet/cell switching, information rate independence, optical transmission and is able to scale to extremely large traffic handling capacities.

The CXA architecture as well as the other elements in the embodiment helps to address objectives such as those mentioned above. Indeed, vendors will have to build or evolve to the new Converged Public Network while meeting a variety of objectives, including without limitation solving the broadband access bottleneck in an economical manner. Evolution can include a dynamic association of customer terminal equipment with service elements in the node.

Carrier Exchange Architecture Example Embodiment

The Carrier Exchange Architecture (CXA) is an architecture for the public network. It is an architecture for the movement of information within an exchange, between exchanges (intercity network) and between the exchange and local service delivery points (metropolitan area network). It is packet based and assumes the use of Ethernet and IP as primary protocols and SONET/SDH/PDH as significant legacy protocols. For voice the architecture assumes a growing role for voice over packet/cell. It also assumes a significant amount of voice traffic will be carried for some time as traditional circuit based toll quality 64 kb traffic. This 64 kb traffic will persist since it is a significant revenue generator. It works well for the voice traffic and much of the data traffic is still low bit rate terminal traffic and would see little if any benefit from higher rates.

For bandwidth management a dynamic transport model relying on wavelength routing is used. A large number of sub-wavelength services exist and are provided using SONET/SDH and PDH. The services architecture is assumed to be client server treating information movement as a virtual resource. FIG. 1 provides a high level view of the CXA.

Key concepts in the CXA example embodiment described herein are:

1. Two switching paradigms provide the most cost effective network: local switching within the exchange area and wide area routing between exchange areas, XAN and WAN.

2. Dynamic reconfigurable networks: real time or near real time provisioning of transport for both recovery and traffic management.

3. Multi-protocol transport architecture: optical transparency or other means are used to simultaneously transport SONET, SDH, ATM, Ethernet or other protocols over shared optical media.

4. Service switching: access between the customer and service delivery points is through switched virtual access connections.

Below is a high level description of the major elements of the CXA. The appendices have additional information on the Xswitch and Wavelength Switch/Router, the essential new transport elements. DWDM line terminals and optical cross-connects are assumed to provide an optical transport mode that is protocol transparent, in particular they must support both SONET/SDH and Ethernet.

Network Evolution and the Two Switching Domains

Figure 2:
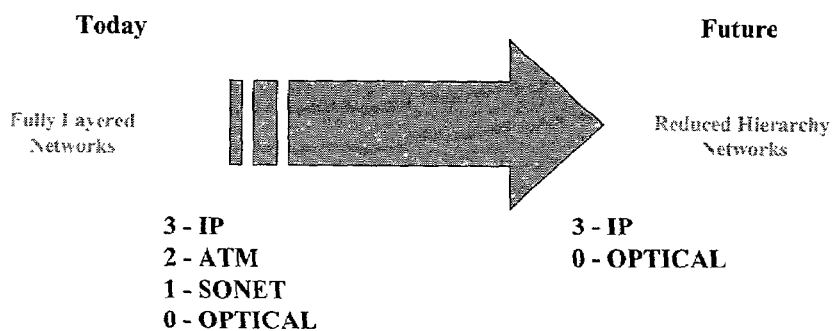
FIG. 2 illustrates a common view of network evolution.

The network is evolving from multiple overlays and fully layered networking to a simpler structure consisting of a converged network and two primary layers, IP and Optical. Functions previously provided in separate network elements, such as layer 2 ATM traffic management, will be provided in either or both the IP and optical network elements. FIG. 2 illustrates this view of network evolution This view of network evolution assumes that a single switching paradigm is best for all switching needs. The protocols most often mentioned are ATM, MPLS and IP. If we look at the switching needs in the exchange area and for the wide area intercity network, we find significant differences. For the exchange area Ethernet and MAC layer networking are a good match. For the wide area intercity network IP and optical transport are well suited. Below is a comparison of these two switching domains using Ethernet for the XAN and IP for the WAN.

TABLE A

Two Switching Domains

| SERVICE SWITCHING-XAN | DESTINATION ROUTING--WAN |
| --- | --- |
| Flat MAC layer networking | Hierarchical Layer 3 networking |
| XAN = Broadcast domain | Multiple administrative domains |
| Address learning | Addressing plan |
| Electrical based sub-wavelength granularity | Wavelength based 3/0 |
| Single hop | Multiple paths |
| "Plug and play" | High complexity |
|   Service advertisement |   Congestion management |
|   Simple priorities |   Load balancing |
|   Short queues |   Recovery |
| |   Security |

Figure 3:
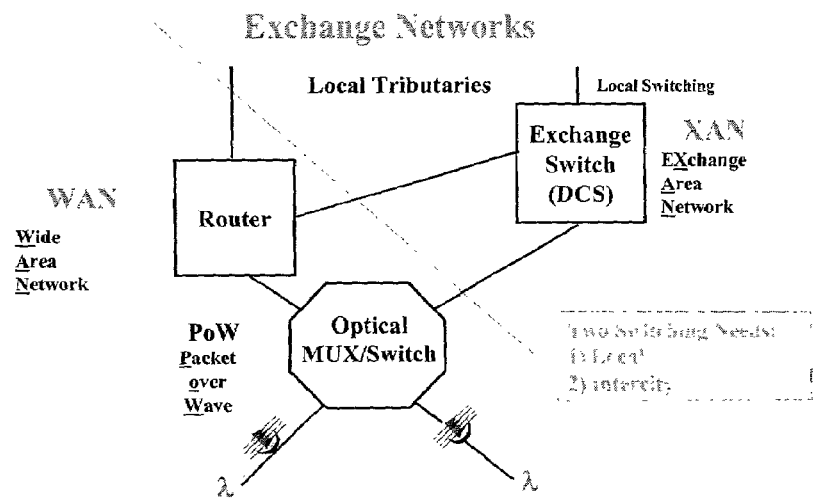
FIG. 3 illustrates a network incorporating two switching domains according to an embodiment of the present invention.

This then leads to the following view of network evolution incorporating two switching domains. FIG. 3 illustrates a network incorporating two switching domains.

Exchange Area Network (XAN)—Xswitch Example Embodiment

The center of all communication within the exchange and with remotely connected access interface elements is the Exchange Area Network (XAN). Referring back to FIG. 1, the XAN is shown as block 110. This uses the Xswitch, new classes of CO switches, to interconnect access, transport and service delivery elements. The Xswitch is a packet switch using MAC layer networking. The choice of packet and MAC provides seamless networking within data networks. MAC layer networking is consistent with new packet voice network architectures. Classic circuit based voice networks will utilize this architecture through shim layer devices, such as for example SALIX 7000 series switching systems identified above. Finally private line and other pure bandwidth services can interface to the XAN through shim layer devices between the SONET/SDH DCS and the Xswitch, such as for example MARTISDXX™ business access products, also offered by Tellabs. According to an embodiment of the present invention, the shim layer may be integrated into the classic network elements. ATM and IP trunk interfaces may be implemented on circuit based voice switches. These data interfaces may be provided on certain traditional DSC systems. Further, an existing multiservice switching platform product may integrate the Xswitch MAC layer function with existing switching, such as SONET/SDH/ATM for example.

Ethernet and XAN capability on an existing multiservice switching platform product may take the form, for example, of an Ethernet pizza box IAD.

A multicast feature may be used to implement the broadcast domain.

MAC layer networking allows the CXA architecture to benefit from the significant asset base of products and software that currently exist both in the public network as well as the enterprise segment. According to an embodiment of the present invention, new service offerings can be developed which provide public Ethernet interfaces to this Converged Public Network. Consistent architectures in the public network and private enterprise networks enable an era of seamless networking and expanded service offerings.

The extensive base of MAC layer devices and software results in cost efficiencies previously not available in Central Office class systems. The dynamics and self-discovery nature of MAC layer networking results in significantly lower operations cost as well as faster time to market and improved e-commerce customer interfacing. MAC layer networking assumes broadcast domains and uses Ethernet protocols. The exchange area, XAN, is essentially a broadcast domain. Collision domains are not important in this architecture. Another difference between the Xswitch and a premise switched Ethernet hub is that the maximum packet/frame length may be restricted to allow priority scheduling mechanism to provide acceptable delays. This may provide a latency that allows a circuit emulation service with acceptable delays at a lower cost than SONET/SDH/ATM AAL1 service.

The broadcast domains allow the devices connected to the XAN to discover each other and establish connections automatically. Therefore as soon as a device is connected to the XAN and declares itself as a resource it is able to provide service. Managing circuits between network elements is no longer necessary. When this architecture is fully delployed and combined with integrated access, a customer can connect to the network and subscribe to its services without any physical changes or manual effort. Existing software and hardware for various elements that connect to the XAN support operation in this environment.

The Ethernet protocol provides a range of interface speeds at attractive costs relative to existing SONET/SDH and PDH interfaces commonly found in COs today. Speeds of 10-Mbit, 100-Mbit and 1-Gbit Ethernet are available today and higher speeds are coming. Both copper and fiber physical media options exist. Ethernet interface costs are very attractive relative to ether SONET or ATM ports. Gig Ethernet ports are presently about $650–$3000 per port, some using copper to others using fiber.

Wide Area Network (WAN)—Wavelength Router Example Embodiment

The Wide Area Network (WAN) interconnecting the carrier's gateway exchanges use DWDM to provide the capacity demanded by data networks. Referring to FIG. 1, the WAN is shown as block 120. These networks are wavelength managed. At the gateway exchanges wavelength routers provide the dynamic management of these wavelengths. Some wavelengths pass through the exchange and some are used to deliver service to the metropolitan area. Local service delivery is provided through the XAN. WAN connections do not pass through the XAN.

The dynamic transport network uses certain techniques that are like those developed originally for the Internet and other data networking. The wavelength routers employ discovery protocols for topology management. Recovery at the optical layer provide fast restoration independent of the transport protocols being used. This optical layer recovery may be supplemented by recovery mechanisms in the transport or network layer Protocols. As an example, IP may reroute traffic for recovery or congestion. For many applications, optical layer restoration may be the primary platform for high reliability networking. In particular optical restoration may be an important capability for the expanded use of MAC layer networking.

Digital Crossconnect Systems (DCS) Example Embodiment

Classic Private Line and other bandwidth services are a significant revenue source today and are likely to remain so for the foreseeable future. Support for SONET/SDH/PDH is mandatory in any exchange architecture. The extensive presence of these systems makes their participation in the CXA important.

To accommodate deterministic bandwidth services the XAN, the Xswitch may implement interfaces to the DCS and a mechanism to facilitate high quality service. Referring to FIG. 1, the DCS is shown as block 150. Options include priority mechanisms and Ethernet protocol extensions. Since voice may also include QoS requirements, a traffic scheduling mechanism may be implemented. According to an embodiment of the present invention, simple scheduling with a minimum of priorities, as few as 2, may be implemented. Given the generally limited distances in the XAN, latency may not be a major factor in queue lengths and algorithms.

The DCS the addition of Ethernet port cards and service advertisement protocols may be desirable. This can be realized using switched Ethernet assets.

Class 5 Voice Switch Example Embodiment

The class 5 voice switch may be interfaced with the XAN. Referring to FIG. 1, the voice switch is shown as block 160. As in the DCS, the addition of port cards and service advertisement protocols may be desirable. Shim layer products, such as systems from the SALIX® 7000 series, may be implemented to avoid any mandatory upgrades of the class 5 switch. Proxy servers may deal with advertising the class 5 service capabilities, which requires some provisioning effort for the proxy. Shim layer products or systems can be used to provide the service advertisement proxy function for the class 5 offices. In this scenario, such a system preferably would be located between the 5ESS/DMS100 and the Xswitch, would be configured to provide all trunk side networking implementing a packet voice strategy, and would also manage the connections to remote line terminals for integrated access devices by proxying the capabilities of the 5ESS/DMS100.

Over time the class 5 switches may evolve to meet the CXA. Alternatively the class 5 switches may be replaced by newer architectures such as softswitches or the Lucent Pathstar Access Gateway product. New architectures based on IP voice, such as the evolution of the Tellabs' CABLESPAN® product, could potentially form part of the CXA.

ATM and Frame Relay Switches

These switches preferably require Ethernet interfaces, which can be derived from versions for the premise market. Referring to FIG. 1, the ATM and frame relay switches are shown as block 170.

Servers, Data Bases and Caches

This family of resources is generally provided on standard computing platforms, such as those provided by Sun Microsystems or Hewlett-Packard. These systems operate in an Ethernet environment. Referring to FIG. 1, the servers, databases, and caches are shown as block 180.

Integrated Access Device (IAD) Example Embodiment

This is an Ethernet device. Referring to FIG. 1, the IAD is shown as block 190.

Software Architecture Example Embodiment

Figure 4:
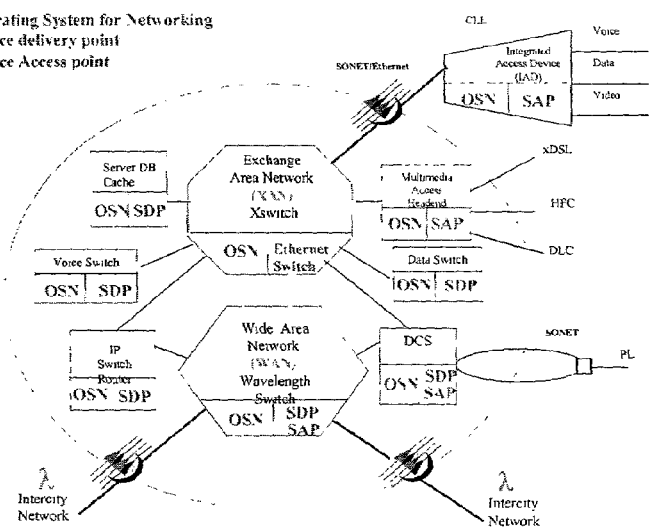
FIG. 4 illustrates the carrier exchange software architecture according to an embodiment of the present invention.

Network elements which are CXA aware run the network operating system and one or more components depending on their function. The Xswitch preferably includes the Ethernet switching software and a VLAN capability for security and broadcast containment. FIG. 4 illustrates a high level representation of the software architecture for a gateway exchange node implementing CXA.

Operating System for Networking Example Embodiment

Windows NT
Novell NetWare high availability
A UNIX flavor

WAN Components Example Embodiments—Control Plane Integration

Recovery Manager
Traffic manager

Preferred XAN Components Example Embodiments—PnP Realization

Service Delivery Point (Server)
Service Access Point (Client)
Service Advertisement
Service Switching/Routing
Service Provider
Service type

Preferred Policy Management Example Embodiments

May implement software to control the network through rules rather than micro management.

Other

Other miscellaneous features which may prove useful might include network management plans, gigabit ethernet transmission standards, and VLAN protocols and software for security purposes.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are accordingly to be regarded in an illustrative rather than in a restrictive sense.

APPENDIX

Glossary for Example Embodiments Described Herein

Broadcast Domain—In MAC layer networking the set of devices that see a transmitted frame from one of its members. In the original Ethernet networks the devices were all connected to a share media, coax or RF, and thus all would see a transmission. The device that was the intended recipient would recognize its address and "read" the remaining message from the media. Special addresses are used to communicate with all devices at one time, a broadcast message.

Collision Domain—The set of devices that attach to a network using a shared communications channel, shared media. A mechanism is required to coordinate the communications so that messages are not corrupted due to overlapping use of the shared communications channel by two or more devices. The two methods used in MAC networks are collision detection, Ethernet, and token passing, Token Ring and FDDI. Collision domains have two characteristics that make them unsuited to exchange area networking: 1) capacity constraints 2) latency considerations.

Exchange Area—A non-overlapping geographical construct used for planning and billing of communications systems. Historically an area within which there is a single uniform set of charges for service. One or more switches in one or more nodes may serve an exchange area. A call that originates and terminates in the same exchange area is a local call. In this paper a metropolitan area, MAN, should be considered the same as an exchange area. More correctly a metropolitan area may contain many exchange areas. Long, long ago you would be known by your "exchange" as in Financial 3 or BUterfield 8.

Flat Networks—Networks that use an unstructured address. Ethernet addresses are an example. The difference between two addresses is a result of the NIC manufacturing. There is no geographical, administrative domain or other information contained in the address.

Foreign Exchange—An exchange other than the home exchange. The home exchange is the exchange area in which one of the communication end points resides, your telephone. Typically this device would be assigned to a switch, dial tone provider, that is in or assigned to this exchange area. If service, dial tone, comes from a switch that services a different exchange area, then this is known as foreign exchange service. In the past this distinction served billing and outside plant purposes.

LAN—Local Area Network. Typically spans a relatively small geographic area. Effectively a broadcast domain.

MAC Layer Networking—Networking based on the 802.x specifications. This is a flat networking model. It uses a variant of the Ethernet protocol, 802.3. Being flat it does not provide for routing. It uses spanning trees to prevent loops, 802.1. The spanning tree provides for redundant paths through port activation.

Multicast—The mechanism used to provide one to many communications in a network that does not have a broadcast domain.

NIC—Network Interface Card. The port card that attaches a device to the network. For Ethernet this card contains the MAC, Ethernet, address.

Rate Center—The roughly geographic center of an exchange area. This is used to determine mileage charges that are used for billing. This mileage is known as "airline miles" in that it is not related to the actual route miles that a connection actually uses. The numerical calculation is based on "V&H" coordinates, points on a Vertical and Horizontal scale overlaying the geographic region. A good use for the math used to calculate triangles.

Shim Layer—An additional layer of processing, hardware or software that is added to an otherwise functionally complete system to mediate interface incompatibilities. An example is a packet voice gateway that is used between legacy circuit switched network elements, class 5 office, and a packet network.

WAN—Wide Area Network. A network which typically spans a relatively large geographic area. Packets are usually transmitted between two points on the network, source and destination. Communications requires a hierarchical addressing structure so that messages can be efficiently routed between source and destination.

XAN—A broadcast domain based on MAC layer Ethernet protocols. Includes service access points, clients, and service delivery points, servers. It uses a switched Ethernet hub to provide a frame based connectionless communications paradigm. The switched Ethernet hub is designed to meet CO requirements for reliability, OSS interfaces and NEBS compliance. See Xswitch.

What is claimed is:

1. A gateway exchange node, comprising:
   an exchange area network (XAN) xswitch; and
   a wide area network (WAN) wavelength switch coupled to the XAN xswitch, the xswitch supports service switching at a sub-wavelength granularity for a network element in an XAN.

2. The gateway exchange node of claim 1, wherein the XAN xswitch supports Ethernet and synchronous optical network (SONET) switching.

3. The gateway exchange node of claim 1, wherein the XAN xswitch comprises a packet switch that performs media access control (MAC) layering networking.

4. The gateway exchange node of claim 1, wherein the WAN wavelength switch supports wavelength switching.

5. The gateway exchange node of claim 4, wherein the WAN wavelength switch implements dense wavelength division multiplexing (DWDM).

6. The gateway exchange node of claim 1, further comprising a digital croasconnect system (DCS) coupled to the XAN xswitch and the WAN wavelength switch.

7. The gateway exchange node of claim 1, further comprising an internet protocol (IP) switch router coupled to the XAN xswitch and the WAN wavelength switch.

8. The gateway exchange node of claim 1, further comprising a voice switch coupled to the XAN xswitch.

9. The gateway exchange node of claim 1, further comprising a data switch coupled to the XAN xswitch.

10. The gateway exchange node of claim 9, wherein the data switch is an Asynchronous Transfer Mode (ATM) switch.

11. The gateway exchange node of claim 1, further comprising a multimedia access head end coupled to the XAN xswitch.

12. The gateway exchange node of claim 1, further comprising a server coupled to the XAN icawitch.

13. The gateway exchange node of claim 1, further comprising a local distribution node coupled to the XAN xswitch.

14. The gateway exchange node of claim 1, further comprising an integrated access device (IAD) coupled to the XAN xswitch.

15. The gateway exchange node of claim 1, further comprising an intercity network coupled to the WAN wavelength switch.

16. A network, comprising:
   a first gateway exchange node having an exchange area network (XAN) xswitch and a wide area network (WAN) wavelength switch; and
   a network operations center (NOC) coupled to the gateway exchange node, the xswitch supports service switching at a sub-wavelength granularity for a network element in an XAN.

17. The network of claim 16, wherein the NOC is coupled to the gateway exchange node via an internet protocol (IP) switch router.

18. The network of claim 16, further comprising a second gateway exchange node coupled to the first gateway exchange node via the WAN wavelength switch.

19. The network of claim 16, further comprising a local distribution node coupled to the first gateway exchange node via the XAN xswitch.

20. A gateway exchange node, comprising:
   an exchange area network (XAN) xswitch;
   a wide area network (WAN) wavelength switch;
   a digital crossconnect system (DCS);
   a data switch;
   a voice switch; and
   an internet protocol (IP) switch router, the xswitch supports service switching at a sub-wavelength granularity for at least one of the DCS, the data switch and the voice switch in an XAN.

21. The gateway exchange node of claim 20, wherein the XAN xswitch, WAN wavelength switch, DCS, data switch, voice switch, and IP switch router all include an operating system for networking.

22. The gateway exchange node of claim 20, wherein the WAN wavelength switch, DCS, data switch, voice switch, and IP switch router all include a service delivery point.

* * * * *